United States Patent [19]

Moon, Sr.

[11] Patent Number: 4,717,168
[45] Date of Patent: Jan. 5, 1988

[54] UTILITY CART

[76] Inventor: James R. Moon, Sr., R.R. 1, Box 79C, Waukee, Iowa 50263

[21] Appl. No.: 905,636

[22] Filed: Sep. 10, 1986

[51] Int. Cl.$^4$ .............................................. B62B 3/02
[52] U.S. Cl. .................................... 280/641; 280/655; 280/47.29; 280/47.37 R; 188/19
[58] Field of Search .............. 280/47.27, 47.28, 47.29, 280/47.34, 639, 641, 651, 652, 654, 655, 47.33; 188/72.1, 72.6, 72.9, 2 F, 19, 20, 21; 354/81, 293; 352/243

[56] References Cited

U.S. PATENT DOCUMENTS

| | | | |
|---|---|---|---|
| 1,641,371 | 9/1927 | Carlson | 188/22 |
| 2,012,628 | 8/1935 | Howell | 248/162 |
| 2,406,183 | 8/1946 | Allen | 280/655 |
| 2,514,825 | 7/1950 | Zenko | 280/47.25 |
| 2,661,672 | 12/1953 | Fairbanks | 354/81 |
| 2,990,764 | 7/1961 | Wilder | 182/127 |
| 3,865,392 | 2/1975 | Hartway | 280/47.13 R |
| 3,930,630 | 1/1976 | Wulff | 248/129 |
| 4,166,687 | 9/1979 | Viering | 354/293 |
| 4,222,145 | 9/1980 | Lowder | 15/353 |
| 4,290,625 | 9/1981 | Barriere | 280/655 |
| 4,348,034 | 9/1982 | Welt | 280/655 |
| 4,401,319 | 8/1983 | Kazmark | 280/655 |
| 4,523,773 | 6/1985 | Holtz | 280/654 |
| 4,637,626 | 1/1987 | Foss et al. | 280/655 |

Primary Examiner—David M. Mitchell
Assistant Examiner—Brian L. Johnson
Attorney, Agent, or Firm—Morton S. Adler

[57] ABSTRACT

A utility cart designed to provide special advantages and convenience in the transportation and use of photographic equipment includes an upstanding frame counterbalanced for easy pushing or pulling on a pair of balloon tired wheels provided with suitable brake means. An equipment carrying platform support and a handle assembly are each pivotally and lockably secured to the upstanding frame so as to be foldable into a compact unit therewith for easy storage or carrying. Means are provided for the removable mounting of a tripod or monopod for use in the cart and to stabilize the cart for such purpose, the handle is foldable to ground engaging position rearwardly of the wheels and a ground engaging caster wheel is provided on the platform support forwardly of the wheels for a four point support base.

14 Claims, 9 Drawing Figures

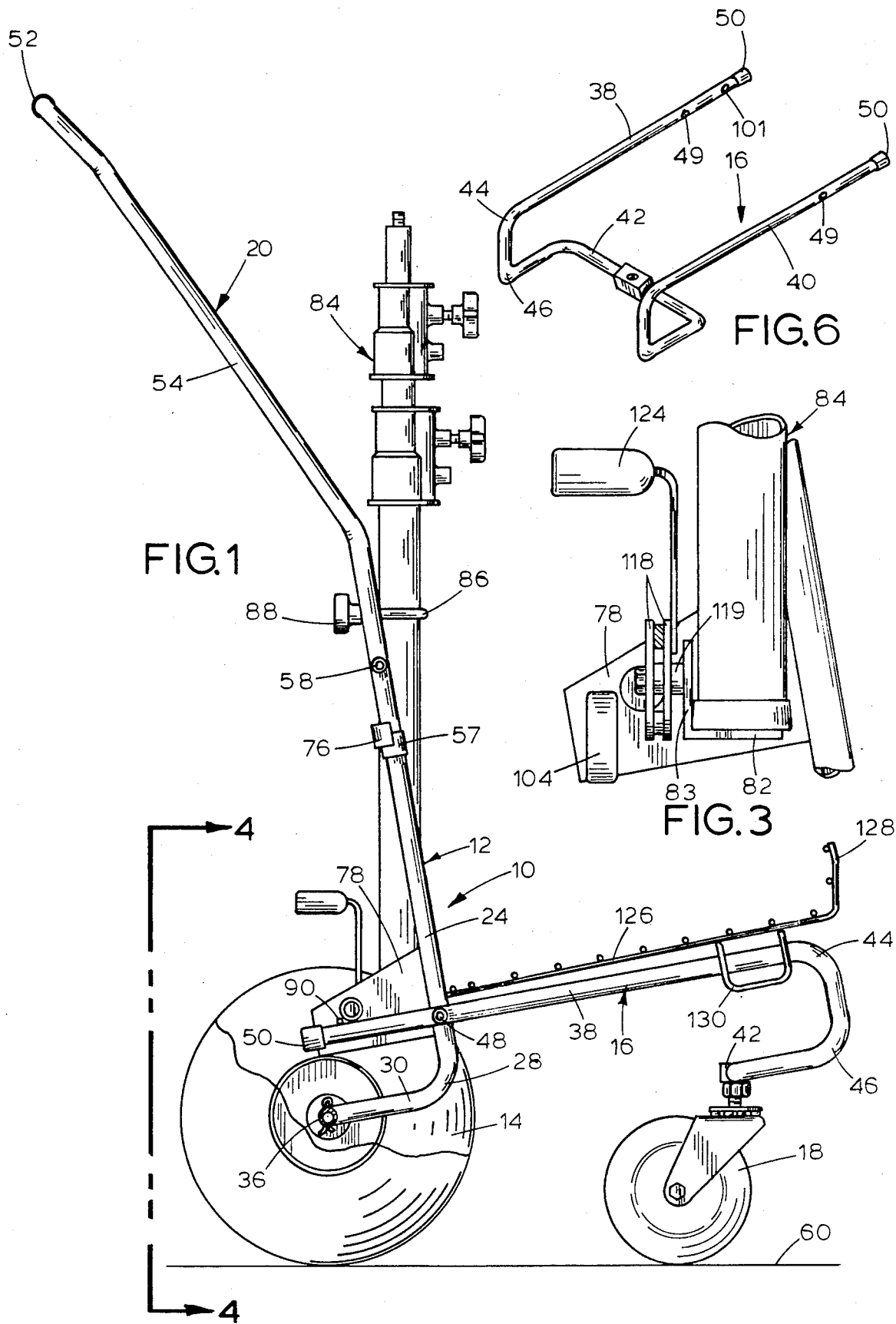

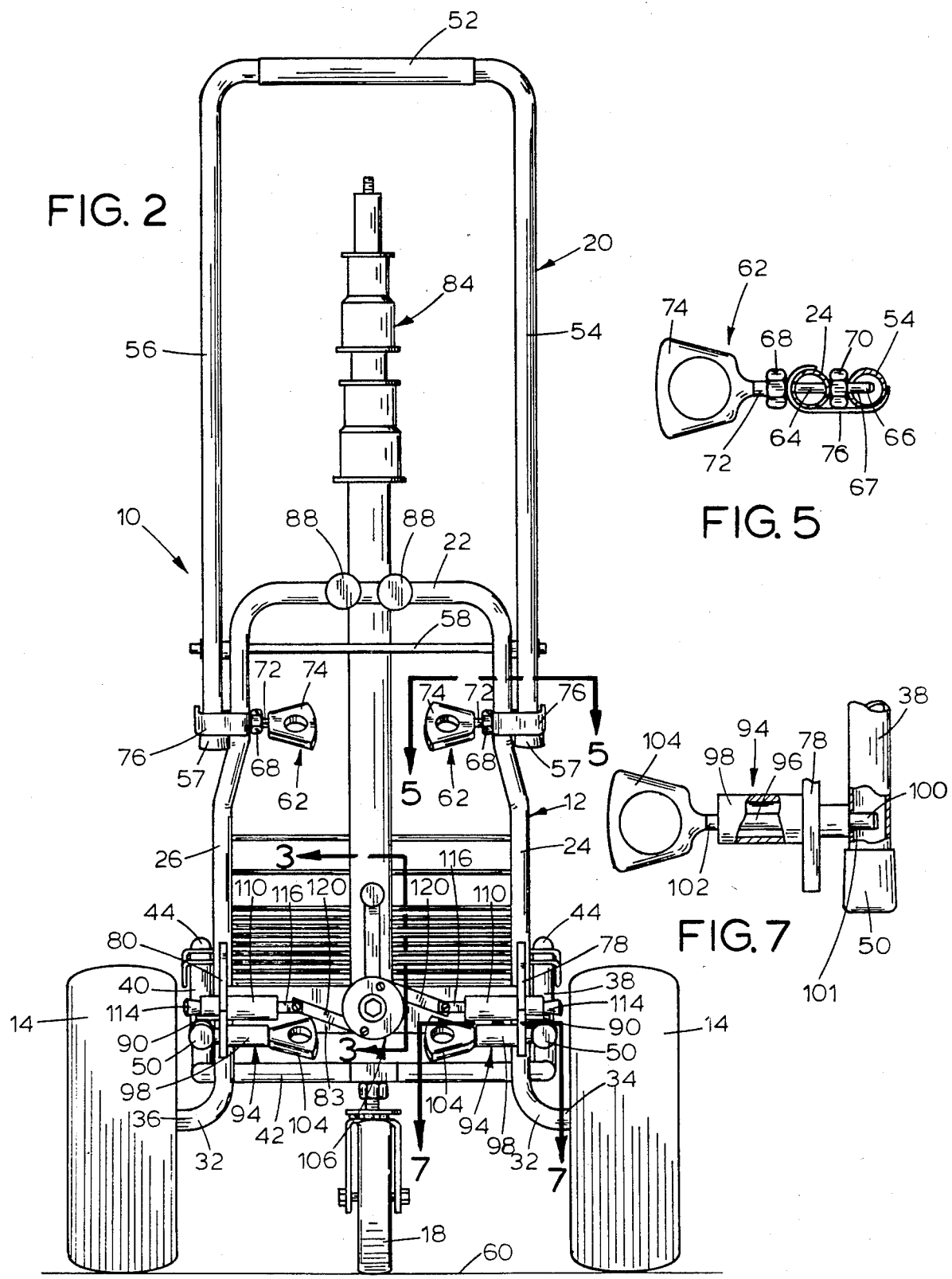

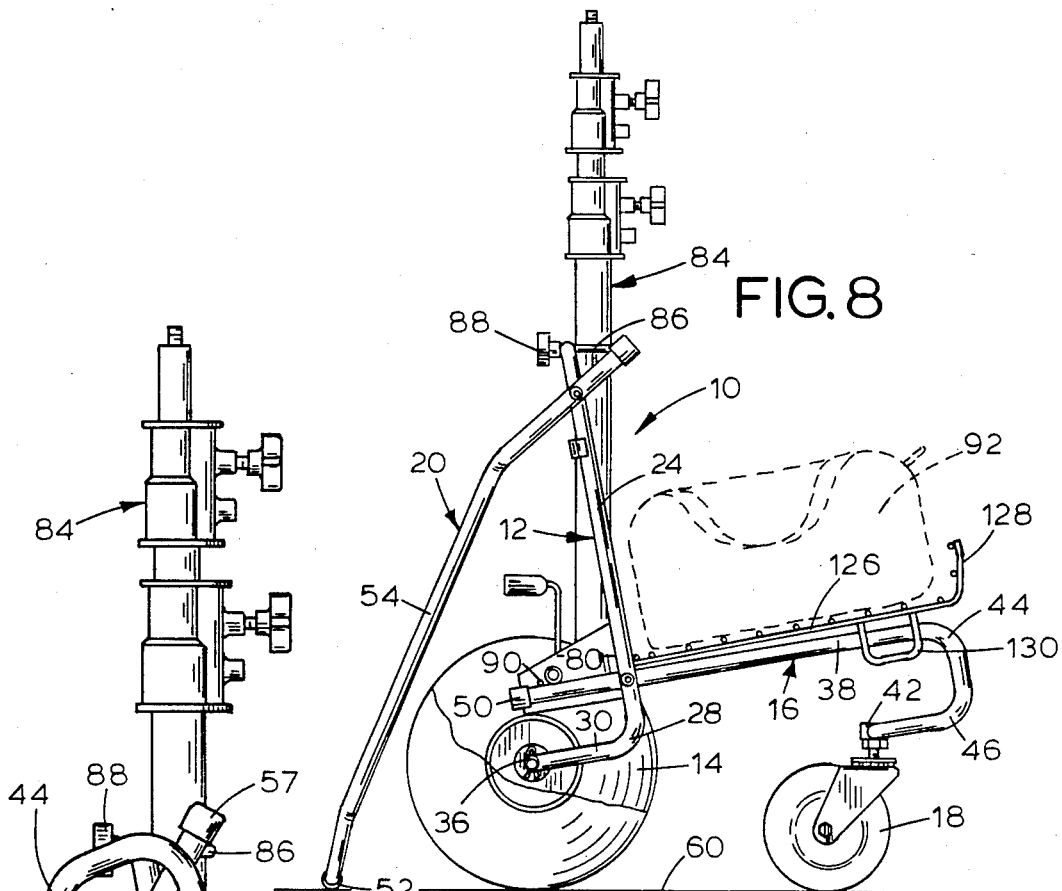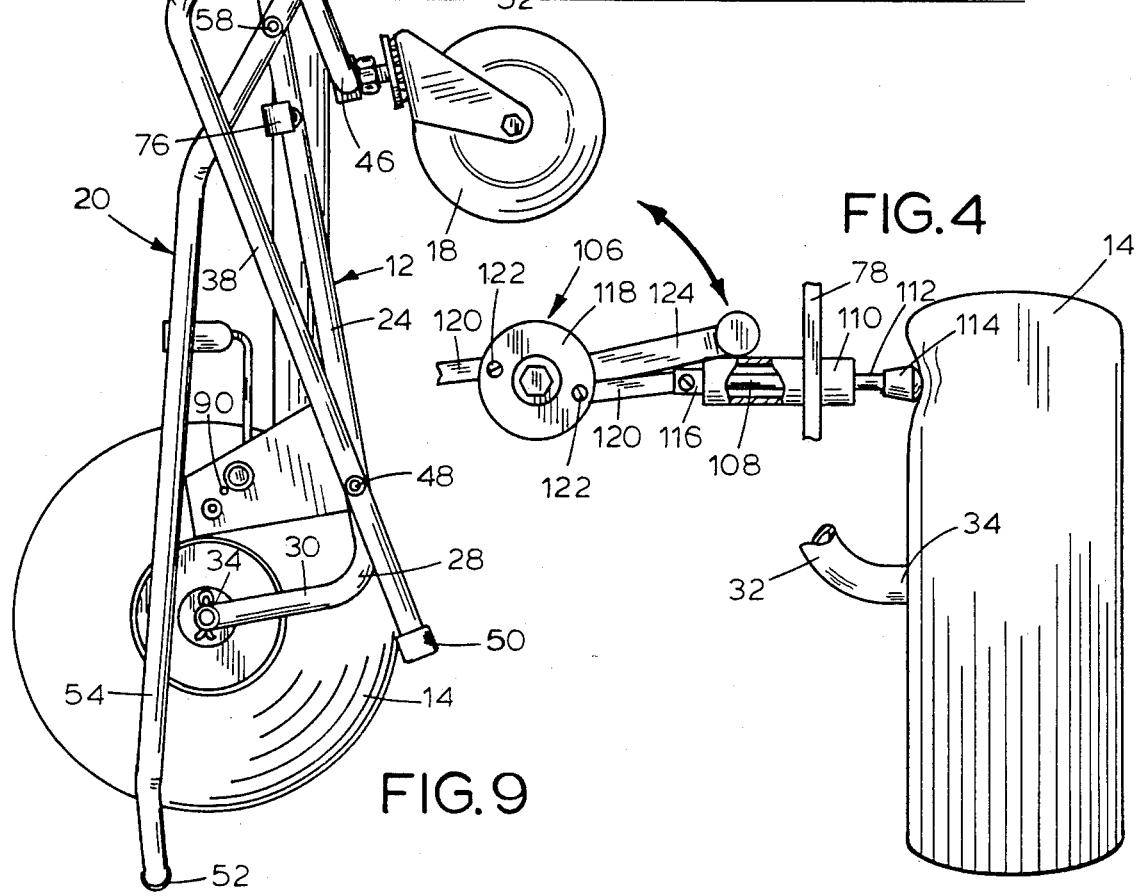

UTILITY CART

BACKGROUND OF THE INVENTION

This invention relates to improvements in utility carts.

While such type of carts are available in a variety of forms and sizes and in many cases for special purposes, I have found as an amateur photographer that they are lacking in many desirable features for photographic missions requiring the transportation and use of desired equipment as for example, in out-of-doors scenic areas.

SUMMARY

One of the important objects of this invention is to provide an improved cart having special advantages and conveniences for photographers in the transportation and use of photographic equipment.

More particularly, it is an object herein to provide a sturdy cart easily capable of supporting all desired cameras and accessories which is counterbalanced for easy pulling or pushing and includes a pair of balloon tired wheels that provide a smooth and gentle movement for expensive equipment.

Another object is to provide a cart of this type that is foldable into a compact unit for carrying or storing when not in use.

A further object is to provide a cart as characterized having means for the removable mounting of a tripod or monopod for use either on or off the cart.

A still further object is to provide a cart of the above class where the handle is foldable to ground engaging position rearwardly of the wheels and a ground engaging wheel is provided forwardly of the wheels to form a four point stabilized support base when using the tripod and the like on the cart.

In accordance with the present invention, this new cart includes an upstanding frame counterbalanced for easy pushing or pulling on a pair of balloon tired wheels provided with suitable brake means. An equipment carrying platform support and a handle assembly are each pivotally and lockably secured to the upstanding frame so as to be foldable into a compact unit for easy storage or carrying. Means are provided for the removable mounting of a tripod or monopod for use on the cart and to stabilize the cart for such purpose, the handle is foldable to ground engaging position rearwardly of the wheels and a ground engaging caster wheel is provided on the platform support forwardly of the wheels for a four point support base.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a right side elevational view of this invention in travel position with portion of the right rear wheel removed and showing by way of illustration a monopod removably mounted thereon, FIG. 2 is a rear elevational view of the cart shown in FIG. 1, FIG. 3 is a fragmentary elevational view taken from the line 3—3 of FIG. 2 to show the brake means and the support for a tripod and the like, FIG. 4 is an enlarged fragmentary elevational view taken from the line 4—4 of FIG. 1 to show the operation of the braking means for this cart, FIG. 5 is an enlarged view, partially in section, of one of two like handle releasable lock means taken from the line 5—5 of FIG. 2, FIG. 6 is a perspective view of the forward support platform for this cart, FIG. 7 is an enlarged view, partially in section, of one of two like lock means between the support platform and the upstanding cart frame taken from the line 7—7 of FIG. 2, FIG. 8 is a reduced side elevational view of this invention similar to FIG. 1 but showing the handle moved to ground engaging position and illustrating an equipment case in broken lines on the forward support platform, and FIG. 9 is an elevational view of this invention showing it in folded position for carrying or storage.

DESCRIPTION OF THE PREFERRED EMBODIMENTS

Referring to the drawings, this cart is designated by the numeral 10 and comprises generally a fixed upstanding inverted U-shaped frame 12 supported on balloon tired wheels 14, a forwardly extending equipment support platform 16, a ground engaging wheel 18 on platform 16 and a handle 20 as best seen in FIGS. 1, 2, 8. Tubular material is preferably used for frame 12, platform 16 and handle 20 although this is not required.

Frame 12 defines a closed top end 22 and spaced depending legs 24, 26 each bent 28 at a corresponding lower portion to extend rearwardly and parallel to each other on a horizontal plane as at 30 (FIGS. 1, 8) to a second bend 32 and then extend perpendicularly outwardly in respective opposite directions to define respective integral axles 34, 36 on which the respective wheels 14 are operably mounted. Platform 16 (FIG. 6) is preferably a single length of tubing bent into a U shape to define spaced parallel side rails 38, 40 oriented rearwardly adjacent and rearwardly of frame legs 24, 26 and a closed end 42 turned first downwardly as at 44 and then rearwardly as at 46 so that end 42 serves as the mounting support for wheel 18 which is preferably a caster wheel. The side rails 38, 40 are pivotally connected to frame legs 24, 26 by a transverse rod 48 through opposite holes 49 in rails 38, 40 and the free end of said rails have like protective caps 50.

Handle 20 defines a closed top end 52 and spaced depending legs 54, 56, with like protective caps 57, disposed to embrace the upper frame legs 24, 26 to which they are pivotally secured by the transverse rod 58 as best seen in FIG. 2. By this arrangement, handle 20 is movable to its upward position relative to frame 12 for pushing or pulling cart 10 as seen in FIG. 1 and to a lower or folded position where, when cart 10 is in upright position on the ground 60, the closed end 52 rests on the ground for added stability as seen in FIG. 8. This movement is controlled by like lock means 62 at each side of frame 12 (FIG. 2) which will be described between frame leg 24 and handle leg 54 (FIG. 5) with like numerals given to like parts for such means between frame leg 26 and handle leg 56.

A spring loaded lock pin 64 is transversely journalled through frame leg 24 with one end 66 extending into handle leg 54 through socket 67 and secured by fittings 68, 70 in a well known manner and the other end 72 is oriented toward frame leg 26 where it is porivided with an apertured knob 74. A U clip 76 on the rear side of frame leg 24 parallel with pin 64 engages handle leg 54 as seen in FIG. 2 to maintain handle 20 in its upper position. With a lock means 62 as described at each side of frame 12, knobs 74 are in sufficiently close spaced relationship that they can be simultaneously grasped by one hand and pulled towards each other to release pins 64 from handle legs 54,56 for moving handle 20 to the position seen in FIG. 8. In returning handle 20 to its upper position, pins 64 in each frame leg will engage each respective handle leg automatically because of the arcuate surface on handle legs 54,56.

At the lower portion of frame 12, respective brackets 78, 80 are rigidly secured to frame legs 24, 26 so as to extend rearwardly in parallel relationship to each other and in spaced parallel relationship with platform rails 38,40 and wheels 14. An angle bar with a horizontal portion 82 and a vertical portion 83 is secured to and between brackets 78, 80 with 82 adapted to support a tripod or monopod and the like 84 for use as illustrated in FIGS. 1, 2, 3, 8 and is secured in such position by means of a U bolt 86 on the closed end 22 of frame 12 engageable with member 84 as shown and adjustable by knobs 88 threadably mounted on the bolt ends. Such arrangement not only secures member 84 for immediate use when needed, but maintains it in such secured position when cart 10 is folded for storage or carrying as seen in FIG. 9.

In the travel position for cart 10, platform 16 is pivoted on rod 48 where wheel 18 is in ground engagement and the rear end portions of rails 38, 40 abut respective like stop rods 90 secured to respective brackets 78, 80 (FIGS. 1, 2, 8). Rods 90 hold platform 16 against further pivotal movement away from frame 12 so that if cart 10 is tilted for travel only on wheels 14, the relationship of platform 16 to frame 12 seen in FIG. 1 is maintained and will support any load such as bag 92 for equipment and supplies that may be placed on it. Platform 16 is releasably locked to frame 12 when in travel position but is movable to a folded position against frame 12 as seen in FIG. 9 by like lock means 94 (FIG. 7) on each bracket 78, 80, similar to lock means 62 (FIG. 5), and will be described between bracket 78 and platform rail 38 with like numerals given to like parts for such means between bracket 80 and platform rail 40.

A spring loaded lock pin 96 in housing 98 attached to and through bracket 78 has one end 100 extending transversely into rail 38 through socket 101 and the other end 102 is oriented toward bracket 80 where it is provided with an apertured knob 104. With a similar lock means relative to rail 40 and bracket 80, the manipulation of knobs 104 to simultaneously disengage pins 96 from rails 38, 40 is the same as that described for lock means 62.

Brake means 106 operable against wheels 14 (FIGS. 2, 4), when desired, are provided and will be described for one wheel seen in FIG. 4 with like parts given like numerals for the opposite wheel. A rod 108 slidably transversely through bracket 78 in a housing 110 attached to such bracket has one end 112 provided with a rubber tip 114 for bearing against the sidewall of the tire on the wheel 14 and the other end 116 is oriented toward bracket 80 so that like rod ends 116 relative to brackets 78, 80 are in opposed spaced relationship intermediate such brackets as best seen in FIG. 2. Intermediate rod ends 116, a pair of spaced disc plates 118 (FIG. 3) are rotatably mounted on bearing 119 to vertical bar 83 adjacent bar 82. Respective rigid links 120 are each pivotally secured at one end to a rod end 116 and pivotally secured at their other respective ends to diametrically opposed points 122 on disc plates 118 to provide a toggle joint. A manually operable handle 124 is provided on discs 118 for rotating the same to a braking position seen in FIG. 4 where tip 114 is pressed against the tire of wheel 14 and held there by the toggle action of links 120 until released by movement of handle 124. A rectangular grill-like rack 126 with a turned up front end 128 is provided to be removably attached to platform rails 38,40 by friction clips 130 for supporting any desired load 92.

Cart 10 as described provides the photography hobbyist with a convenient means for carrying assortment of equipment and accessories on frequent sallies for likely subjects in various scenic areas that often include terrain where manually carrying such equipment would be burdensome. Of particular advantage is the fact that the tripod or monopod, which is essential for good pictures, can be mounted, with camera attached if desired, for use at any time on a moment's notice so that the time saved in otherwise having to set up the tripod can make the difference in getting or not getting a desired picture should the subject, for example, be a bird or animal whose presence may be only fleeting and to better stabilize the cart for tripod use, only seconds are required to brake wheels 14 and drop handle 20 to ground engaging position. When time for taking a picture is not important, the tripod is easily and quickly removable. This cart is counterbalanced for easy pushing or pulling on balloon tired wheels to minimize jarring to sensitive equipment that may be carried and the foldability of the cart makes it convenient to store or transport over long distances in the trunk of a car. Accordingly, in view of the foregoing, it is thought a full understanding of the construction and operation of this invention will be had and the advantages of the same will be appreciated.

I claim:

1. A utility cart, comprising:
    an upstanding inverted U-shaped frame defining a closed top end and spaced depending legs suitably formed at their lower ends to define respective oppositely oriented integral axles,
    a respective tired wheel operably journalled on each axle,
    a respective bracket rigidly secured to each leg so as to extend rearwardly therefrom in parallel relationship adjacent a respective wheel,
    a bar secured to and between said brackets to support a tripod and the like in operable position,
    an elongated inverted U-shaped handle defining a closed top end and spaced depending legs disposed to embrace the closed top end of said frame adjacent a respective frame leg,
    means pivotally connecting said handle to said frame,
    means on said frame for releasably lockably engaging said handle,
    means on said frame for releasably securing a tripod and the like in operable position,
    brake means on said brackets operable against said wheels, comprising:
        respective oppositely disposed slidable rods operably mounted transversely through said respective brackets so that one respective end of each rod is engageable with the sidewall of a tire on a respective wheel, a vertically disposed disc rotatably mounted to said bar intermediate the other respective ends of said rods, a handle on said disc for manually rotating the same, respective links each pivotally connected at one end to respective opposed points on said disc and similarly connected at their other ends to the other respective ends of said rods to provide a toggle connection between said rods and said disc, the rotation of said disc in one direction serving to press said rods into engagement said tire to prevent rotation of said wheel and to maintain said position by virtue of said toggle connection, and rotation of said disc in the opposite direction serving to withdraw said rods from engagement with said tires, an equipment support platform having a rear and forward end, means pivotally securing said read end to said frame, and means carried by said brackets for releasably lockably engaging said platform.

2. A cart as defined in claim 1 including a ground engaging wheel mounted to the forward end of said platform.

3. A cart as defined in claim 1 wherein the tire on each wheel is a balloon tire.

4. A cart as defined in claim 1 wherein the means on said frame for releasably securing a tripod and the like comprises a U-bolt on the closed top end of said frame.

5. A cart as defined in claim 1 wherein the means on said frame for releasably engaging said handle comprises:

respective oppositely disposed spring loaded lock pins operably mounted transversely through respective legs so as to be normally in operable engagement at one end with a respective leg for holding said handle against movement relative to said frame and extending at their other respective ends towards each other to a closely spaced position, a knob on said other respective ends whereby said knobs can be simultaneously gripped for movement towards each other to simultaneously release said lock pins from engagement with said handle, in locked position, said handle being in vertical ascending relationship to said frame for use in pushing or pulling said cart, and in unlocked position, said handle being foldable rearwardly to place its closed end in a ground engaging position to provide added stability for said cart for use of a tripod and the like thereon.

6. A cart as defined in claim 5 wherein said knobs are apertured to facilitate simultaneous gripping by one hand.

7. A cart as defined in claim 5 including:

each free end portion of said handle provided with a socket, and said respective lock pins normally journalled at one end in a respective socket.

8. A cart as defined in claim 1 including:

said platform having a ground engaging wheel at its forward end and rearwardly extending spaced side rails disposed respectively adjacent the lower portion of a respective frame leg, respective oppositely disposed spring loaded lock pins operably mounted transversely through a respective bracket so as to be normally in operable engagement at one end near the rear end of a respective rail for holding said platform against movement relative to said frame and extending at their other respective ends towards each other to a closely spaced position, a knob on said other respective ends whereby said knobs can be simultaneously gripped for movement toward each other to simultaneously release said pins from engagement with said platform, in locked position, said platform being substantially horizontally disposed with the wheel thereon in ground engagement for travel, and in unlocked position, said frame being foldable onto said platform for storage or carrying.

9. A cart as defined in claim 8 wherein said knobs are apertured to facilitate simultaneous gripping by one hand.

10. A cart as defined in claim 8 including:

said respective side rails provided with a socket, and said respective lock pins normally journalled at one end in a respective socket.

11. A cart as defined in claim 1 including a rubber tip on each tire engaging rod end.

12. A utility cart, comprising:

an upstanding inverted U-shaped tubular frame defining a closed top end and spaced depending legs, each of said legs having a first bend at a corresponding lower portion to extend rearwardly and parallel to each other on a horizontal plane to a second bend and then extending away from each other in respective opposite directions to define respective integral axles, a wheel with a balloon tire operably journalled on each axle, a respective bracket rigidly secured to each leg above said first bend to extend rearwardly in parallel relationship adjacent a respective wheel, a bar secured to and between said brackets to support a tripod and the like in operable position, an elongated inverted U-shaped tubular handle defining a closed top end and spaced depending legs disposed to embrace the closed end of said frame adjacent a respective frame leg, first respective spring loaded slidable lock pins mounted to said respective frame legs in operable engagement with an adjacent handle leg for releasably lockably engaging said handle, means for simultaneously disengaging said lock pins from said handle, means on the closed end of said frame for securing a tripod and the like in operable position, respective slidable rods mounted to said respective brackets and adapted to engage a respective tire in braking relationship, means for selectively simultaneously engaging and disengaging said rods from said tires, an equipment support platform having a rear and forward end, means pivotally securing said rear end to said frame, second respective spring loaded slidable lock pins mounted to said respective brackets in operable engagement with an adjacent rear end portion of said platform to hold it against pivotal movement, and means for simultaneously releasing said second lock pins from engagement with said platform.

13. A cart as defined in claim 12 wherein the means on the closed end of said frame for securing a tripod and the like in operable position comprises a U bolt.

14. A cart as defined in claim 12 including a ground engaging wheel mounted to the forward end of said platform.

* * * * *